United States Patent
Zhu et al.

(10) Patent No.: US 10,575,266 B2
(45) Date of Patent: Feb. 25, 2020

(54) METHOD AND SYSTEM FOR MAINTAINING TIME-FREQUENCY SYNCHRONISATION, AND TERMINAL

(71) Applicant: YULONG COMPUTER TELECOMMUNICATION SCIENTIFIC (SHENZHEN) CO., LTD., Shenzhen, Guangdong (CN)

(72) Inventors: Yajun Zhu, Guangdong (CN); Yunfei Zhang, Guangdong (CN); Yiqing Cao, Guangdong (CN); Chenlu Zhang, Guangdong (CN)

(73) Assignee: NANCHANG COOLPAD INTELLIGENT TECHNOLOGY COMPANY LIMITED, Nanchang, Jiangxi Province (CN)

( * ) Notice: Subject to any disclaimer, the term of this patent is extended or adjusted under 35 U.S.C. 154(b) by 393 days.

(21) Appl. No.: 15/328,391

(22) PCT Filed: Jul. 31, 2014

(86) PCT No.: PCT/CN2014/083488
§ 371 (c)(1),
(2) Date: Jan. 23, 2017

(87) PCT Pub. No.: WO2016/015315
PCT Pub. Date: Feb. 4, 2016

(65) Prior Publication Data
US 2017/0215158 A1 Jul. 27, 2017

(51) Int. Cl.
*H04W 56/00* (2009.01)
*H04W 72/12* (2009.01)
(Continued)

(52) U.S. Cl.
CPC .......... *H04W 56/001* (2013.01); *H04L 5/0048* (2013.01); *H04W 24/00* (2013.01);
(Continued)

(58) Field of Classification Search
CPC ............... H04W 40/005; H04W 48/08; H04W 72/1226; H04W 56/001; H04L 5/0048
See application file for complete search history.

(56) References Cited

U.S. PATENT DOCUMENTS

| | | | |
|---|---|---|---|
| 9,736,803 B2 * | 8/2017 | Sun | H04W 16/02 |
| 2012/0122444 A1 * | 5/2012 | Yoon | H04W 24/02 455/422.1 |

(Continued)

FOREIGN PATENT DOCUMENTS

| | | |
|---|---|---|
| CN | 102421172 A | 4/2012 |
| CN | 102438249 A | 5/2012 |

(Continued)

OTHER PUBLICATIONS

International Search Report for PCT/CN2014/083488, dated Apr. 1, 2015, ISA/CN.

(Continued)

*Primary Examiner* — Rasheed Gidado
(74) *Attorney, Agent, or Firm* — Yue (Robert) Xu; Apex Attorneys at Law, LLP

(57) ABSTRACT

A method for maintaining time and frequency synchronization when a micro-cell base station is in an off state, a system for maintaining time and frequency synchronization when a micro-cell base station is in an off state, and a terminal are provided. The method includes: detecting a signal sent by a macro-cell base station or the micro-cell base station in a subframe at a predefined position when the micro-cell base station is in an off state; and performing an operation for maintaining time and frequency synchronization with the (Continued)

micro-cell base station based on the signal sent in the subframe at the predefined position.

9 Claims, 2 Drawing Sheets

(51) Int. Cl.
- *H04W 48/08* (2009.01)
- *H04W 40/00* (2009.01)
- *H04L 5/00* (2006.01)
- *H04W 24/00* (2009.01)
- *H04L 29/08* (2006.01)
- *H04W 16/32* (2009.01)

(52) U.S. Cl.
CPC ......... *H04W 40/005* (2013.01); *H04W 48/08* (2013.01); *H04W 56/00* (2013.01); *H04W 72/1226* (2013.01); *H04L 69/323* (2013.01); *H04W 16/32* (2013.01)

(56) References Cited

U.S. PATENT DOCUMENTS

| | | | | |
|---|---|---|---|---|
| 2013/0010658 | A1* | 1/2013 | Zhu | H04W 56/0015 370/280 |
| 2013/0189932 | A1 | 7/2013 | Shen et al. | |
| 2014/0247808 | A1* | 9/2014 | Zhang | H04L 5/003 370/331 |
| 2015/0036530 | A1* | 2/2015 | Wu | H04L 5/0073 370/252 |
| 2015/0181543 | A1 | 6/2015 | Hwang et al. | |
| 2015/0208372 | A1* | 7/2015 | You | H04J 11/0069 370/350 |
| 2015/0341877 | A1* | 11/2015 | Yi | H04W 56/00 370/350 |
| 2016/0037426 | A1* | 2/2016 | Li | H04W 36/0094 370/332 |
| 2016/0088579 | A1* | 3/2016 | Harada | H04W 48/10 370/336 |
| 2016/0192334 | A1* | 6/2016 | Takeda | H04W 48/16 370/329 |
| 2016/0242123 | A1* | 8/2016 | Harada | H04W 84/10 |

FOREIGN PATENT DOCUMENTS

| | | |
|---|---|---|
| CN | 103841574 A | 6/2014 |
| CN | 103874176 A | 6/2014 |
| EP | 2693809 A2 | 2/2014 |
| WO | 2014017765 A1 | 1/2014 |
| WO | 2014071224 A1 | 5/2014 |

OTHER PUBLICATIONS

European Search Report for Application No. 14898687.0 , dated Mar. 20, 2018, 8 pages.

* cited by examiner

METHOD AND SYSTEM FOR MAINTAINING TIME-FREQUENCY SYNCHRONISATION, AND TERMINAL

FIELD

The application is the national phase of International Application No. PCT/CN2014/083488, titled "METHOD AND SYSTEM FOR MAINTAINING TIME-FREQUENCY SYNCHRONISATION, AND TERMINAL", filed on Jul. 31, 2014, the entire content of which is hereby incorporated by reference.

BACKGROUND

In a current wireless communication system, miniaturization of a base station and densification of network nodes become an inevitable tendency in order to further improve the capacity of the network. However, the densification of the network nodes inevitably results in mutual interference between network nodes, and strong interference between nodes may greatly affect performance of the system.

In order to address an issue of interference between low power nodes, in 3rd Generation Partnership Project (3GPP), a lot of standardization efforts are made. In a scene of the R10/11 phase, in which a macro base station and a low power base station operate with a same frequency, a method of almost blank subframe (ABS) is introduced. In the ABS method, an interference resource may configure an ABS subframe in a subframe, an interfered node may schedule its user suffering severe interference in the ABS subframe. In the R12 phase, a method of switching on the small cell and switching off the small cell is introduced for a scene of denser small cells (a low power wireless access node, which may be understood as a micro cell base station). Some small cells may be turned on or turned off based on change of a service or change of the interference. In this way, interference between small cells can be avoided, and it is beneficial to save power for the base station.

In the case of introducing the method of switching on the small cell and switching off the small cell, the small cell needs to send a discovery reference signaling (DRS) when the small cell is in an off state, such that a terminal discovers and measures the cell. In the conventional mechanism, the terminal needs to maintain time and frequency synchronization continuously based on a pilot frequency sent by the base station. In addition, in order to reduce a transition delay between the on and off states of the cell, the terminal needs to measure and feed back channel state information (CSI) when the small cell is in the off state, such that the terminal can schedule the transmission performed by a user as quickly as possible when the small cell is in an on state.

Therefore, it is urgent to solve a technical issue of maintaining time and frequency synchronization of the terminal when the micro-cell base station is in the off state.

SUMMARY

Based on at least one of the above technical issues, a solution for maintaining time and frequency synchronization when a micro-cell base station is in an off state is provided in the present disclosure, such that a terminal can maintain synchronization with the micro-cell base station when the micro-cell base station is in an off state.

In view of the above, according to the present disclosure, a method for maintaining time and frequency synchronization when a micro-cell base station is in an off state is provided, which includes: detecting a signal sent by a macro-cell base station or the micro-cell base station in a subframe at a predefined position when the micro-cell base station is in an off state; and performing an operation for maintaining time and frequency synchronization with the micro-cell base station based on the signal sent in the subframe at the predefined position.

In the technical solution, the signal sent by the micro-cell base station or the macro-cell base station on the predefined subframe is detected when the micro-cell base station is in an off state, such that the terminal can maintain synchronization with the micro-cell base station by measuring the signal sent in the subframe.

In the above-described technical solution, preferably, before the step of detecting the signal sent by the macro-cell base station or the micro-cell base station in the predefined at the predefined position, the method further includes: receiving a subframe position and configuration information of a pilot signal for maintaining time and frequency synchronization sent by the micro-cell base station or the macro-cell base station; the step of detecting the signal sent by the macro-cell base station or the micro-cell base station sent in a subframe at the predefined position includes: detecting the pilot signal for maintaining time and frequency synchronization in the subframe at the predefined position of the pilot signal for maintaining time and frequency synchronization. The step of performing an operation for maintaining time and frequency synchronization with micro-cell base station based on the signal sent in the subframe at the predefined position includes: performing the operation for maintaining time and frequency synchronization based on the configuration information of the pilot signal.

In the technical solution, the subframe position and the configuration information of the pilot signal for maintaining time and frequency synchronization which are sent by the micro-cell base station or the macro-cell base station are received, such that the terminal can measure the pilot signal for maintaining time and frequency synchronization in the subframe at the position based on the subframe position of the pilot signal for maintaining time and frequency synchronization, and the terminal achieves the time and frequency synchronization with the micro-cell base station, based on the configuration information of the pilot signal.

In the above-described technical solution, preferably, the configuration information includes a type of the pilot signal, time and frequency resource occupied by the pilot signal and the number of the pilot signal.

In the above-described technical solution, preferably, the micro-cell base station or the macro-cell base station sends the subframe position and the configuration information of the pilot signal for maintaining time and frequency synchronization via a radio resource control signaling, a medium access control element signaling or a physical layer signaling.

In the above-described technical solution, preferably, the step of detecting the signal sent by the micro-cell base station in the subframe at the predefined position includes: detecting a discovery signal sent by the micro-cell base station in the subframe at the predefined position.

In the technical solution, the terminal achieves the operation for maintaining time and frequency synchronization based on the discovery signal, by detecting the discovery signal sent by the micro-cell base station in the subframe at the predefined position.

In the above-described technical solution, preferably, the micro-cell base station or the macro-cell base station sends the position of the subframe for transmitting the discovery signal and configuration information of the discovery signal via the radio resource control signaling, the medium access control element signaling or the physical layer signaling.

In the above-described technical solution, preferably, the step of detecting the signal sent by the macro-cell base station in the subframe at the predefined position includes: detecting the pilot signal sent by the macro-cell base station.

In the technical solution, the time and frequency synchronization between the terminal and the micro-cell base station can be maintained by detecting the pilot signal sent by the macro-cell base station.

In the above-described technical solution, preferably, the method further includes: measuring channel state information of the micro-cell base station; and sending the channel state information of the micro-cell base station to the micro-cell base station, where the micro-cell base station performs an operation for scheduling resources based on the channel state information when the micro-cell base station enters the on state.

In the technical solution, the terminal measures the channel state information of the micro-cell base station when the micro-cell base station is in the off state, the operation for scheduling resources can be directly performed on the terminal when the micro-cell base station enters the on state, which avoids increasing time of waiting for resource scheduling by the terminal due to measuring the channel state when the micro-cell base station is in the on state, and is beneficial to improve an efficiency for resource scheduling.

There are multiple methods for measuring the channel state information by the terminal. Preferred measuring methods are described as follows.

First Method

In the above-described technical solution, preferably, the step of measuring channel state information of the micro-cell base station includes: measuring, when the micro-cell base station sends a state transition instruction for switching from the off state to the on state, the channel state information of the micro-cell base station in a subframe in which the state transition instruction is sent.

Second Method

In the above-described technical solution, preferably, the step of measuring channel state information of the micro-cell base station includes: measuring, before the micro-cell base station enters the on state, the channel state information of the micro-cell base station based on predefined pilot information for channel state measurement sent by the micro-cell base station.

In the above-described technical solution, preferably, the micro-cell base station or the macro-cell base station transmits a subframe position of the predefined pilot information and configuration information of the predefined pilot information via the radio resource control signaling, the medium access control element signaling or the physical layer signaling. The configuration information includes: the type of the pilot information, the time and frequency resources occupied by the pilot information and the number of the pilot information.

Third Method

In the above-described technical solution, preferably, the step of measuring the channel state information of the micro-cell base station includes: measuring the channel state information of the micro-cell base station based on pilot information periodically sent by the micro-cell base station.

In the above-described technical solution, preferably, the micro-cell base station or the macro-cell base station sends the configuration information of the pilot information and a transmission period of the pilot information, the position of the subframe for transmitting the pilot information and an uploading manner of the channel state information via the radio resource control signaling, the medium access control element signaling or the physical layer signaling.

According to a second aspect of the present disclosure, a system for maintaining time and frequency synchronization when a micro-cell base station is in an off state is further provided, which includes: a detecting unit configured to detect a signal sent by a macro-cell base station or the micro-cell base station in a subframe at a predefined position when the micro-cell base station is in an off state; and a processing unit configured to perform an operation for maintaining time and frequency synchronization with the micro-cell base station based on the signal sent in the subframe at the predefined position.

In the technical solution, the signal sent by the micro-cell base station or the macro-cell base station in the subframe at the predefined position is detected when the micro-cell base station is in the off state, such that a terminal can maintain synchronization with the micro-cell base station by measuring the signal sent in the subframe.

In the above-described technical solution, preferably, the system may further include: a receiving unit configured to receive a subframe position and configuration information of a pilot signal for maintaining time and frequency synchronization sent by the micro-cell base station or the macro-cell base station; the detecting unit is further configured to detect the pilot signal for maintaining time and frequency synchronization in the subframe at the predefined position of the pilot signal for maintaining time and frequency synchronization; and the processing unit is further configured to perform the operation for maintaining time and frequency synchronization based on the configuration information of the pilot signal.

In the technical solution, the subframe position and the configuration information of the pilot signal for maintaining time and frequency synchronization which are sent by the micro-cell base station or the macro-cell base station are received, such that the terminal can measure the pilot signal for maintaining time and frequency synchronization in the subframe at the position based on the subframe position of the pilot signal for maintaining time and frequency synchronization, and the terminal achieves the time and frequency synchronization with the micro-cell base station, based on the configuration information of the pilot signal In the above-described technical solution, preferably, the configuration information includes a type of the pilot signal, time and frequency resource occupied by the pilot signal and the number of the pilot signal.

In the above-described technical solution, preferably, the micro-cell base station or the macro-cell base station sends the subframe position and the configuration information of the pilot signal for maintaining time and frequency synchronization via a radio resource control signaling, a medium access control element signaling or a physical layer signaling.

In the above-described technical solution, preferably, the detecting unit is configured to detect a discovery signal sent by the micro-cell base station in the subframe at the predefined position.

In the technical solution, the terminal achieves the operation for maintaining time and frequency synchronization based on the discovery signal, by detecting the discovery signal sent by the micro-cell base station in the subframe at the predefined position.

In the above-described technical solution, preferably, the micro-cell base station or the macro-cell base station sends the position of the subframe for transmitting the discovery signal and configuration information of the discovery signal via the radio resource control signaling, the medium access control element signaling or the physical layer signaling.

In the above-described technical solution, preferably, the detecting unit is configured to detect a signal sent by the macro-cell base station in the subframe at the predefined position includes: detecting the pilot signal sent by the macro-cell base station.

In the technical solution, the time and frequency synchronization between the terminal and the micro-cell base station can be maintained by detecting the pilot signal sent by the macro-cell base station.

In the above-described technical solution, preferably, the system further includes: a measuring unit configured to measure channel state information of the micro-cell base station; and a sending unit configured to send the channel state information of the micro-cell base station to the micro-cell base station, where the micro-cell base station performs an operation for scheduling resources based on the channel state information when the micro-cell base station enters the on state.

In the technical solution, the terminal measures the channel state information of the micro-cell base station when the micro-cell base station is in the off state, the operation for scheduling resources can be directly performed on the terminal when the micro-cell base station enters the on state, which avoids increasing time of waiting for resource scheduling by the terminal due to measuring the channel state when the micro-cell base station is in the on state, and is beneficial to improve an efficiency for resource scheduling.

There are multiple methods for measuring the channel state information by the terminal. Preferred measuring methods are described as follows.

First Method

In the above-described technical solution, preferably, the step of measuring the channel state information of the micro-cell base station includes: measuring, when the micro-cell base station sends a state transition instruction for switching from the off state to the on state, the channel state information of the micro-cell base station in a subframe in which the state transition instruction is sent.

Second Method

In the above-described technical solution, preferably, the step of measuring channel state information of the micro-cell base station includes: measuring, before the micro-cell base station enters the on state, the channel state information of the micro-cell base station based on predefined pilot information for channel state measurement sent by the micro-cell base station.

In the above-described technical solution, preferably, the micro-cell base station or the macro-cell base station transmits a subframe position of the predefined pilot information and configuration information of the predefined pilot information via the radio resource control signaling, the medium access control element signaling or the physical layer signaling. The configuration information includes: the type of the pilot information, time and frequency resources occupied by the pilot information and the number of the pilot information.

Third Method

In the above-described technical solution, preferably, the step of measuring the channel state information of the micro-cell base station includes: measuring the channel state information of the micro-cell base station based on pilot information periodically sent by the micro-cell base station.

In the above-described technical solution, preferably, the micro-cell base station or the macro-cell base station may send a transmission period of the pilot information, the position of the subframe for transmitting the pilot information and an uploading manner of the channel state information via the radio resource control signaling, the medium access control element signaling or the physical layer signaling.

According to another aspect of the present disclosure, a terminal is further provided, which includes the system for maintaining time and frequency synchronization when a micro-cell base station is in an off state according to any one of the above-described technical solutions.

With the above-described technical solution, the terminal can maintain synchronization with the micro-cell base station when the micro-cell base station is in the off state, and measure the channel state of the micro-cell base station when the micro-cell base station is in the off state.

DETAILED DESCRIPTION

In order to better understand the above objects, features and advantages of the present disclosure more clearly, the technical solutions will be further illustrated in conjunction with the drawings and the embodiments of the disclosure. It should be noted that the embodiments of the present disclosure and features in the embodiments may be combined with each other in case of no conflict.

To fully understand the disclosure, the following embodiments are described in detail. The disclosure may be achieved by other ways different from the embodiments. Hence, the scope of the present disclosure is not subject to the following.

Figure 1:
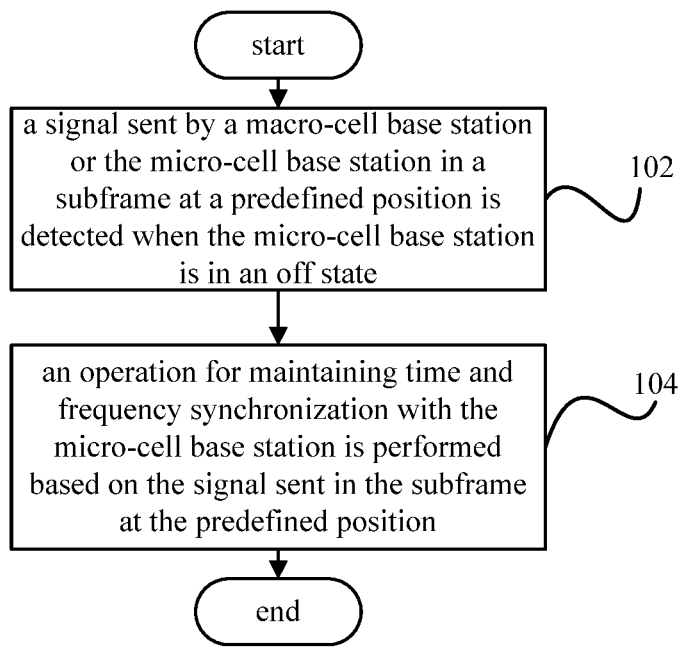
FIG. 1 shows a schematic flowchart of a method for maintaining time and frequency synchronization when a micro-cell base station is in an off state according to an embodiment of the present disclosure.

FIG. 1 shows a schematic flowchart of a method for maintaining time and frequency synchronization when a micro-cell base station is in an off state according to an embodiment of the present disclosure.

As shown in FIG. 1, the method for maintaining time and frequency synchronization when the micro-cell base station is in the off state according to the embodiment of the present disclosure includes step 102 and step 104. In step 102, a signal sent by a macro-cell base station or the micro-cell base station in a subframe at a predefined position is detected when the micro-cell base station is in an off state. In step 104, an operation for maintaining time and frequency synchronization with the micro-cell base station is performed based on the signal sent in the subframe at the predefined position.

In the technical solution, the terminal can measure the signal sent by the micro-cell base station or the macro-cell base station in the subframe at the predefined position when the micro-cell base station is in the off state by detecting the signal sent by the micro-cell base station or the macro-cell base station in the subframe at the predefined position to achieve the synchronization between the terminal and the micro-cell base station.

In the above-described technical solution, preferably, before the step of detecting the signal sent by the micro-cell base station or the macro-cell base station in the subframe at the predefined position, the method further includes: receiving a subframe position and configuration information of a pilot signal for maintaining time and frequency synchronization, which are sent by the micro-cell base station or the macro-cell base station. The step of detecting the signal sent by the macro-cell base station or the micro-cell base station in the subframe at the predefined position includes: detecting the pilot signal for maintaining time and frequency synchronization in the subframe at the predefined position of the pilot signal for maintaining time and frequency synchronization. The step of performing an operation for maintaining time and frequency synchronization with micro-cell base station based on the signal sent in the subframe at the predefined position includes: performing the operation for maintaining time and frequency synchronization based on the configuration information of the pilot signal.

In the technical solution, the subframe position and the configuration information of the pilot signal for maintaining time and frequency synchronization which are sent by the micro-cell base station or the macro-cell base station are received, such that the terminal can measure the pilot signal for maintaining time and frequency synchronization in the subframe at the position based on the subframe position of the pilot signal for maintaining time and frequency synchronization, and the terminal achieves the time and frequency synchronization with the micro-cell base station, based on the configuration information of the pilot signal.

In the above-described technical solution, preferably, the configuration information include the type of the pilot signal, time and frequency resource occupied by the pilot signal and the number of the pilot signal.

In the above-described technical solution, preferably, the micro-cell base station or the macro-cell base station sends the subframe position and the configuration information of the pilot signal for maintaining time and frequency synchronization via radio resource control signaling, medium access control element signaling or physical layer signaling.

In the above-described technical solution, preferably, the step of detecting the signal sent by the micro-cell base station in the subframe at the predefined position includes: detecting a discovery signal sent by the micro-cell base station in the subframe at the predefined position.

In the technical solution, the terminal achieves the operation for maintaining time and frequency synchronization based on the discovery signal, by detecting the discovery signal sent by the micro-cell base station in the subframe at the predefined position.

In the above-described technical solution, preferably, the micro-cell base station or the macro-cell base station sends the position of the subframe for transmitting the discovery signal and the configuration information of the discovery signal via the radio resource control signaling, the medium access control element signaling or the physical layer signaling.

In the above-described technical solution, preferably, the step of detecting the signal sent by the macro-cell base station in the subframe at the predefined position includes: detecting the pilot signal sent by the macro-cell base station.

In the technical solution, the time and frequency synchronization between the terminal and the micro-cell base station can be maintained by detecting the pilot signal sent by the macro-cell base station.

In the technical solution, preferably, the method further includes: measuring channel state information of the micro-cell base station; and sending the channel state information of the micro-cell base station to the micro-cell base station, such that the micro-cell base station performs an operation for scheduling resources based on the channel state information when the micro-cell base station enters the on state.

In the technical solution, the terminal measures the channel state information of the micro-cell base station when the micro-cell base station is in the off state, and the operation for scheduling resources can be directly performed on the terminal when the micro-cell base station enters the on state, which avoids increasing time of waiting for resource scheduling by the terminal due to measuring the channel state when the micro-cell base station is in the on state, and is beneficial to improve an efficiency for resource scheduling.

There are multiple methods for measuring the channel state information by the terminal. Preferred measuring methods are described as follows.

First Method

In the above-described technical solution, preferably, the step of measuring the channel state information of the micro-cell base station includes: measuring, when the micro-cell base station sends a state transition instruction for switching from the off state to the on state, the channel state information of the micro-cell base station in a subframe in which the state transition instruction is sent.

Second Method

In the above-described technical solution, preferably, the step of measuring the channel state information of the micro-cell base station includes: measuring the channel state information of the micro-cell base station based on predefined pilot information for channel state measurement sent by the micro-cell base station, before the micro-cell base station enters the on state.

In the above-described technical solution, preferably, the micro-cell base station or the macro-cell base station transmits the subframe position of the predefined pilot information and configuration information of the predefined pilot information via the radio resource control signaling, the medium access control element signaling or the physical layer signaling. The configuration information includes: the type of the pilot information, time and frequency resources occupied by the pilot information and the number of the pilot information.

Third Method

In the above-described technical solution, preferably, the step of measuring the channel state information of the micro-cell base station includes: measuring the channel state information of the micro-cell base station based on pilot information periodically sent by the micro-cell base station.

In the above-described technical solution, preferably, the micro-cell base station or the macro-cell base station sends the configuration information of the pilot information and a transmission period of the pilot information, the position of the subframe for transmitting the pilot information and an uploading manner of the channel state information via the radio resource control signaling, the medium access control element signaling or the physical layer signaling.

Figure 2:
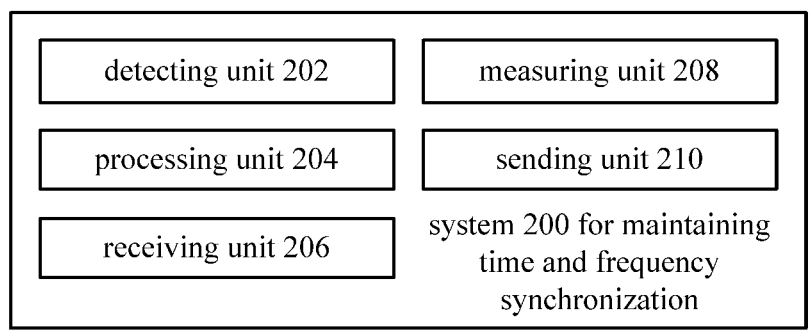
FIG. 2 shows a schematic block diagram of a system for maintaining time and frequency synchronization when a micro-cell base station is in an off state according to an embodiment of the present disclosure.

FIG. 2 shows a schematic block diagram of a system for maintaining time and frequency synchronization when a micro-cell base station is in an off state according to an embodiment of the present disclosure.

As shown in FIG. 2, a system 200 for maintaining time and frequency synchronization when a micro-cell base station is in an off state according to the embodiment of the present disclosure includes a detecting unit 202 and a processing unit 204. The detecting unit 202 is configured to detect a signal sent by a macro-cell base station or the micro-cell base station in a subframe at a predefined position when the micro-cell base station is in an off state.

The processing unit 204 is configured to perform an operation for maintaining time and frequency synchronization with the micro-cell base station based on the signal sent in the subframe at the predefined position.

In the technical solution, the signal sent by the micro-cell base station or the macro-cell base station in the subframe at the predefined position is detected when the micro-cell base station is in the off state, such that a terminal can maintain synchronization with the micro-cell base station by measuring the signal sent in the subframe the at the predefined position.

In the above-described technical solution, preferably, the system further includes: a receiving unit 206 configured to receive a subframe position and configuration information of a pilot signal for maintaining time and frequency synchronization sent by the micro-cell base station or the macro-cell base station. The detecting unit 202 is further configured to detect the pilot signal for maintaining time and frequency synchronization in the subframe at the predefined position of the pilot signal for maintaining time and frequency synchronization. The processing unit 204 is further configured to perform an operation for maintaining time and frequency synchronization based on the configuration information of the pilot signal.

In the technical solution, the subframe position and the configuration information of the pilot signal for maintaining time and frequency synchronization sent by the micro-cell base station or the macro-cell base station are received, such that the terminal can measure the pilot signal for maintaining time and frequency synchronization in the subframe at the predefined position, and maintain time and frequency synchronization with the micro-cell base station based on the configuration information of the pilot signal.

In the above-described technical solution, preferably, the configuration information includes: the type of the pilot signal, time and frequency resource occupied by the pilot signal and the number of the pilot signal.

In the above-described technical solution, preferably, the micro-cell base station or the macro-cell base station sends the subframe position and the configuration information of the pilot signal for maintaining time and frequency synchronization via a radio resource control signaling, a medium access control element signaling or a physical layer signaling.

In the above-described technical solution, preferably, the detecting unit 202 is configured to detect a discovery signal sent by the micro-cell base station in the subframe at the predefined position.

In the technical solution, the terminal achieves an operation for maintaining time and frequency synchronization based on the discovery signal, by detecting the discovery signal sent by the micro-cell base station in the subframe at the predefined position.

In the technical solution, the micro-cell base station sends the discovery signal in the subframe at the predefined position, such that the terminal maintains the synchronization based on the subframe position for transmitting the discovery signal.

In the technical solution, preferably, the micro-cell base station or the macro-cell base station sends the subframe position for transmitting the discovery signal and configuration information of the discovery signal via the radio resource control signaling, the medium access control element signaling or the physical layer signaling.

In the technical solution, preferably, the detecting unit 202 is configured to detect a pilot signal sent by the macro-cell base station.

In the technical solution, the time and frequency synchronization with the micro-cell base station can be maintained by detecting the pilot signal sent by the macro-cell base station.

In the above-described technical solution, preferably, the system further includes: a measuring unit 208 configured to measure channel state information of the micro-cell base station; and a sending unit 210 configured to send the channel state information of the micro-cell base station to the micro-cell base station, such that the micro-cell base station performs an operation for scheduling resources based on the channel state information when the micro-cell base station enters an on state.

In the technical solution, the terminal measures the channel state information of the micro-cell base station when the micro-cell base station is in the off state, such that the operation for scheduling resources can be directly performed on the terminal when the micro-cell base station enters the on state, which avoids increasing time of waiting for resource scheduling by the terminal due to measuring the channel state when the micro-cell base station is in the on state, and is beneficial to improve an efficiency for resource scheduling.

There are multiple methods for measuring the channel state information by the terminal. Preferred measuring methods are described as follows.

First Method

In the above-described technical solution, preferably, the measuring unit 208 is configured to measure, when the micro-cell base station sends a state transition instruction for switching from the off state to the on state, the channel state information of the micro-cell base station in a subframe in which the state transition instruction is sent.

Second Method

In the above-described technical solution, preferably, the measuring unit 208 is configured to measure the channel state information of the micro-cell base station based on predefined pilot information for channel state measurement sent by the micro-cell base station, before the micro-cell base station enters the on state.

In the above-described technical solution, preferably, the micro-cell base station or the macro-cell base station transmit the subframe position of the predefined pilot information and configuration information of the predefined pilot information via the radio resource control signaling, the medium access control element signaling or the physical layer signaling. The configuration information includes: the type of the pilot information, time and frequency resource occupied by the pilot information and the number of the pilot information.

Third Method

In the above-described technical solution, preferably, the measuring unit 208 is configured to measure the channel state information of the micro-cell base station based on pilot information periodically sent by the micro-cell base station.

In the above-described technical solution, preferably, the micro-cell base station or the macro-cell base station sends a period of the pilot information, the subframe position for transmitting the pilot information and an uploading manner of the channel state information via the radio resource control signaling, the medium access control element signaling or the physical layer signaling.

The technical solutions of the present disclosure are described in detail in conjunction with FIG. 3 and FIG. 4 hereinafter.

In order to better illustrate the technical solutions of the present disclosure, a scene is assumed as follows:

(1) a terminal is constantly connected to a cell for ensuring mobility; and (2) the terminal has a capability of carrier aggregation (CA) or dual connectivity (DC), and a small cell is configured, as a Scell (i.e., a micro-cell) of the terminal or a Scell in an secondary cell group (SCG), for the terminal.

Figure 3:
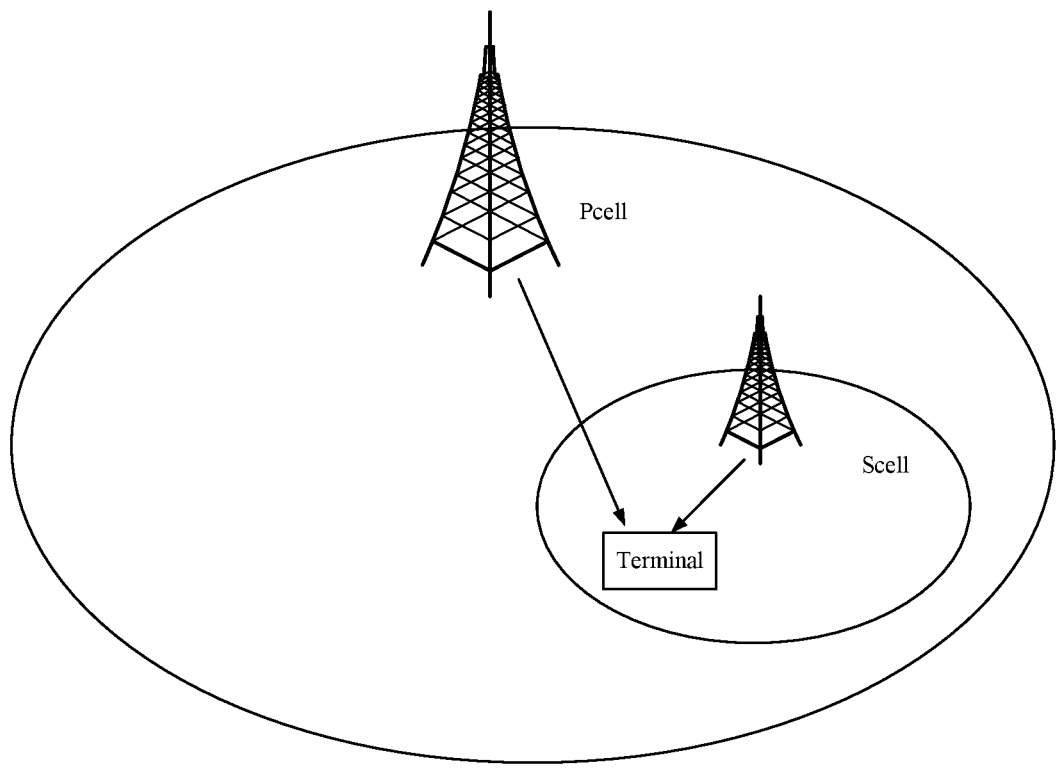
FIG. 3 shows a schematic structural diagram of a system for maintaining time and frequency synchronization when a micro-cell base station is in an off state according to an embodiment of the present disclosure.

As shown in FIG. 3, a Pcell is used to ensure connection of the terminal when the terminal is moving. It should be noted that, the case that Pcell is used as a macro-cell in FIG. 3 is only an example, and the macro-cell may be a micro-cell based on the same method. The small cell used as the Scell improves a data rate for the terminal, which can be achieved by a Scell configuration in a CA or DC mechanism.

For an issue how to measure a channel when the micro-cell base station is in an off state, methods according to the present disclosure are described as follows.

First method: the Scell schedules a terminal using a conservative method. In this method, the terminal may obtain channel state information (CSI) based on a discovery reference signaling (DRS), but the transmission period of the DRS is long, accurate CSI information can not be acquired by measuring the CSI based on the DRS in a scene of quickly switching on and off the small cell. Therefore, the Scell can only schedule the terminal by using the conservative method, for example the Scell may schedule the terminal by only using a single rank and low multipoint conferencing server (MCS).

Second method: the Scell serves the terminal by using CSI information which is measured and reported by the Scell last time.

Third method: the terminal measures and reports CSI in a subframe in which the Scell transmits a DCI for indicating that the terminal is about to enter an on state. A type of a pilot frequency used for the measurement and configuration information of the pilot frequency need to be notified to the terminal in advance.

Figure 4:
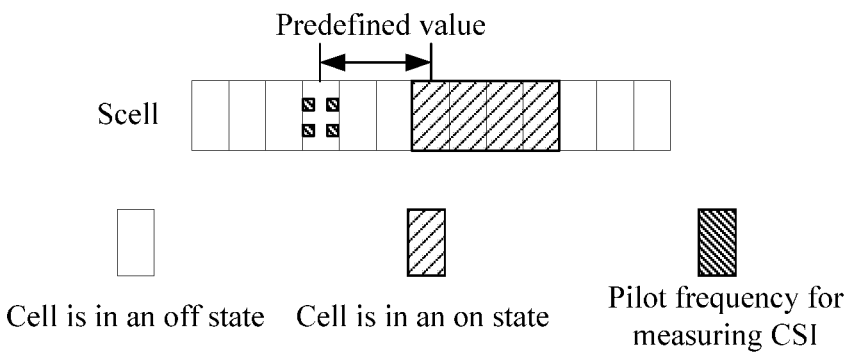
FIG. 4 shows a schematic structural diagram of a subframe for transmitting pilot information for measuring a channel state according to an embodiment of the present disclosure.

Fourth method: as shown in FIG. 4, pilot information for measuring CSI is transmitted in a subframe before a subframe in which the Scell enter the on state. The pilot information may be CRS, CSI-RS or other pilot frequency for measuring CSI. A position of the subframe for transmitting the pilot frequency is predefined, the Pcell or the Scell may inform the terminal about subframe information for transmitting the pilot frequency and configuration information of the pilot frequency via the radio resource control (RRC) signaling, the medium access control (MAC) control element (CE) or the physical layer signaling.

Fifth method: the Scell may periodically send transmission information of the pilot frequency, such that the terminal measures the CSI. The Pcell or the S cell may inform the terminal of the transmission period of the pilot frequency and time and frequency position via the RRC signaling, the MAC CE or the physical layer signaling. In addition, the Pcell or the Scell may configure the terminal to report the CSI periodically.

The terminal maintains, when the micro-cell base station is in an off state, time and frequency synchronization with the micro-cell base station by using the following methods according to the disclosure.

First method: the terminal maintains synchronization in a subframe in which DRS is transmitted.

Second method: the Pcell or the Scell informs the terminal about a position of transmitting the pilot frequency for maintaining time and frequency synchronization and related configuration via the RRC signaling, the MAC CE or the physical layer signaling. The pilot frequency may be a pilot frequency of a type defined in the current protocol version, for example primary synchronization signal (PSS), secondary synchronization signal (SSS), cell-specific reference signal (CRS), channel state information reference signal (CSI-RS) or other types of pilot frequency.

Third method: in a case that there is a Pcell, the terminal may adjust the time and frequency synchronization error for the Scell by detecting pilot frequency transmission of the Pcell, thereby maintaining time and frequency synchronization.

The technical solutions of the present disclosure are described in detail in conjunction with the drawings. According to the present disclosure, a new solution for maintaining time and frequency synchronization when a micro-cell base station is in an off state is provided, such that the terminal can maintain synchronization with the micro-cell base station when the micro-cell base station is in an off state, which forms an essential function for the micro-cell base station in a quick switch mechanism; and a channel state of the micro-cell base station can be measured when the micro-cell base station is in an off state.

The foregoing embodiments are only preferred embodiments of the disclosure and are not meant to limit the disclosure. The preferred embodiments according to the disclosure are disclosed above, and are not intended to limit the disclosure. Those of skills in the art may make, based on the disclosed method and technical content, some variations and improvements on the technical solutions of the disclosure, or make some equivalent variations on the embodiments without departing from the scope of the technical solutions. All simple modifications, equivalent variations and improvements made based on the technical essence of the disclosure without departing from content of the technical solutions of the disclosure fall in the scope of the technical solutions of the disclosure.

The invention claimed is:

1. A method for maintaining time and frequency synchronization when a micro-cell base station is in an off state, comprising:

receiving a subframe position and configuration information of a pilot signal for maintaining time and frequency synchronization sent by a macro-cell base station or the micro-cell base station;

detecting the pilot signal for maintaining time and frequency synchronization in the subframe position of the pilot signal for maintaining time and frequency synchronization when the micro-cell base station is in an off state;

performing an operation for maintaining time and frequency synchronization based on the configuration information of the pilot signal;

measuring channel state information of the micro-cell base station, comprising:

measuring, when the micro-cell base station sends a state transition instruction for switching from the off state to the on state, the channel state information of the micro-cell base station in a subframe in which the state transition instruction is sent; and sending the channel state information of the micro-cell base station to the micro-cell base station, wherein the micro-cell base station performs an operation to schedule resources based on the channel state information when the micro-cell base station enters the on state.

2. The method for maintaining time and frequency synchronization when a micro-cell base station is in an off state according to claim 1, wherein the configuration information comprises:

a type of the pilot signal, time and frequency resource occupied by the pilot signal and the number of the pilot signal.

3. The method for maintaining time and frequency synchronization when a micro-cell base station is in an off state according to claim 1, wherein the micro-cell base station or the macro-cell base station sends the subframe position and the configuration information of the pilot signal for maintaining time and frequency synchronization via a radio resource control signaling, a medium access control element signaling or a physical layer signaling.

4. A system for maintaining time and frequency synchronization when a micro-cell base station is in an off state, comprising:

one or more processors; and a memory storing program instructions which, when executed by the one or more processors, configure the apparatus to:

receive a subframe position and configuration information of a pilot signal for maintaining time and frequency synchronization sent by a macro-cell base station or the micro-cell base station;

detect the pilot signal for maintaining time and frequency synchronization in the subframe of the pilot signal for maintaining time and frequency synchronization when the micro-cell base station is in an off state;

perform an operation for maintaining time and frequency synchronization based on the configuration information of the pilot signal;

measure channel state information of the micro-cell base station, comprising:

measure, when the micro-cell base station sends a state transition instruction for switching from the off state to the on state, the channel state information of the micro-cell base station in a subframe in which the state transition instruction is sent; and send the channel state information of the micro-cell base station to the micro-cell base station, wherein the micro-cell base station performs an operation for scheduling resources based on the channel state information when the micro-cell base station enters the on state.

5. The system for maintaining time and frequency synchronization when a micro-cell base station is in an off state according to claim 4, wherein the configuration information comprises:

a type of the pilot signal, time and frequency resource occupied by the pilot signal and the number of the pilot signal.

6. The system for maintaining time and frequency synchronization when a micro-cell base station is in an off state according to claim 4, wherein the micro-cell base station or the macro-cell base station sends the subframe position and the configuration information of the pilot signal for maintaining time and frequency synchronization via a radio resource control signaling, a medium access control element signaling or a physical layer signaling.

7. A terminal, comprising the system for maintaining time and frequency synchronization when a micro-cell base station is in an off state, wherein the system comprises:

one or more processors; and a memory storing program instructions which, when executed by the one or more processors, configure the apparatus to:

receive a subframe position and configuration information of a pilot signal for maintaining time and frequency synchronization sent by a macro-cell base station or the micro-cell base station;

detect the pilot signal for maintaining time and frequency synchronization in the subframe of the pilot signal for maintaining time and frequency synchronization when the micro-cell base station is in an off state;

perform an operation for maintaining time and frequency synchronization based on the configuration information of the pilot signal;

measure channel state information of the micro-cell base station, comprising:

measure, when the micro-cell base station sends a state transition instruction for switching from the off state to the on state, the channel state information of the micro-cell base station in a subframe in which the state transition instruction is sent; and send the channel state information of the micro-cell base station to the micro-cell base station, wherein the micro-cell base station performs an operation for scheduling resources based on the channel state information when the micro-cell base station enters the on state.

8. The terminal according to claim 7, wherein the configuration information comprises:

a type of the pilot signal, time and frequency resource occupied by the pilot signal and the number of the pilot signal.

9. The terminal according to claim 7, wherein the micro-cell base station or the macro-cell base station sends the subframe position and the configuration information of the pilot signal for maintaining time and frequency synchronization via a radio resource control signaling, a medium access control element signaling or a physical layer signaling.

* * * * *